Nov. 4, 1924.
W. E. McKEE
1,514,390
VEHICLE JACK
Filed Sept. 16, 1924
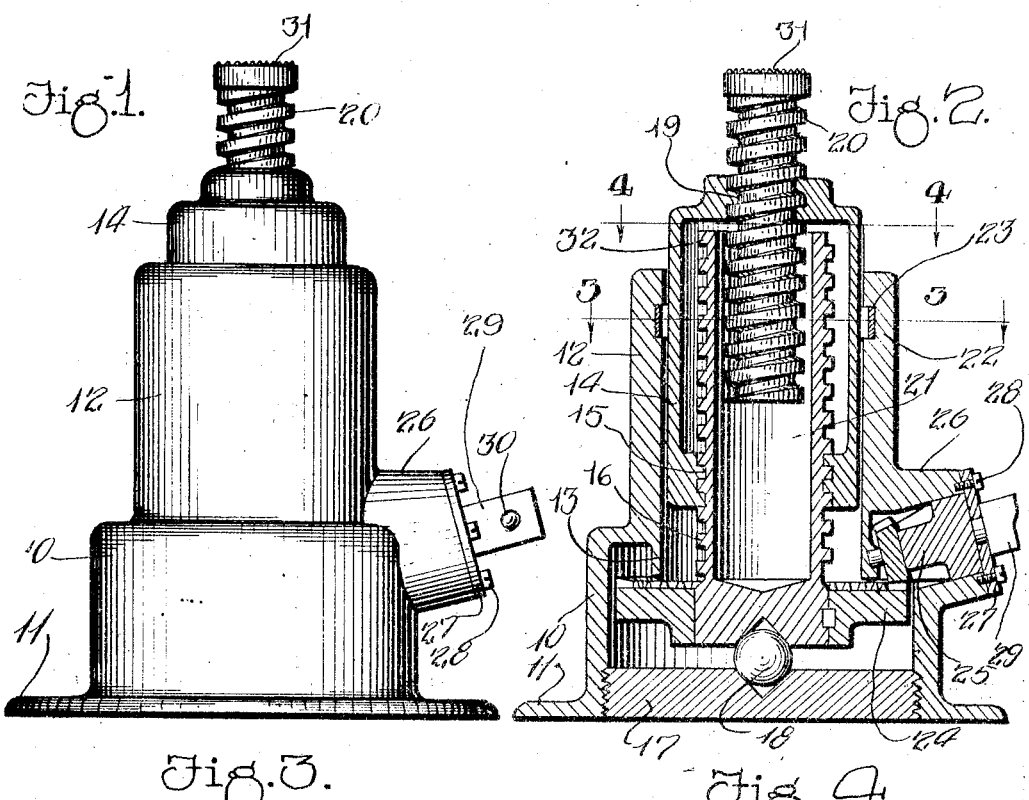
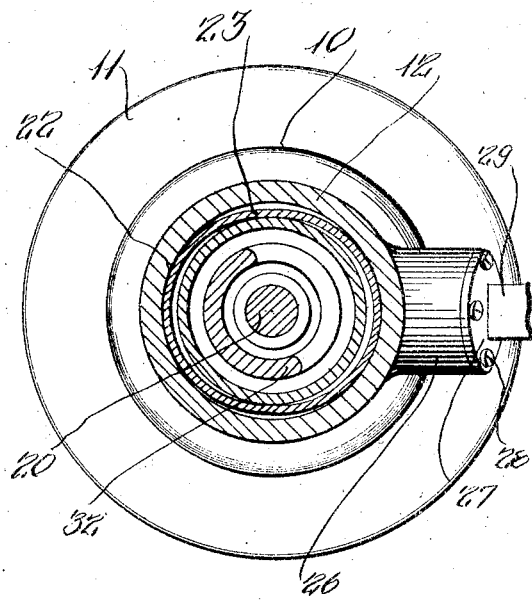
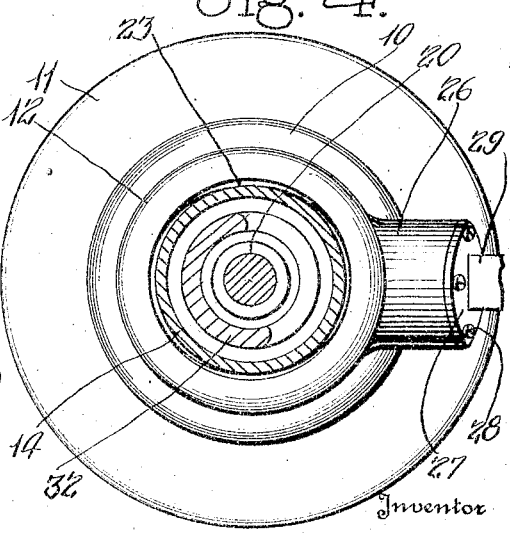
Inventor
William E. McKee.
By J. Larkin
Attorney Patented Nov. 4, 1924.

1,514,390

UNITED STATES PATENT OFFICE.

WILLIAM E. McKEE, OF JOLIET, ILLINOIS, ASSIGNOR TO WILLIAM E. PRATT MANUFACTURING CO., OF CHICAGO, ILLINOIS.

VEHICLE JACK.

Application filed September 16, 1924. Serial No. 738,048.

*To all whom it may concern:*

Be it known that WILLIAM E. McKEE, citizen of the United States, residing at Joliet, in the county of Will and State of Illinois, has invented certain new and useful Improvements in Vehicle Jacks, of which the following is a specification.

This invention relates to vehicle jacks and has special reference to a jack for vehicles using the so called "balloon" tires.

The term "balloon" as applied to tires refers to a type of pneumatic tire which is of great cross section when compared to the ordinary pneumatic tire for the same vehicle. This enlargement of the cross section of the tire, for a wheel of a certain diameter, necessitates a corresponding decrease in the diameter of the wheel center and rim so that, whenever the tire is deflated, the axle drops closer to the ground than is ordinarily the case. Furthermore, the increased cross section of such tires necessitates a greater range of lift than ordinary since, in removing a deflated tire from its wheel, the axle must be lifted from the unusually low position to a position fully as high as that to which it is lifted when the common form of pneumatic tire is used.

The principal objects of the present invention include the provision of a novel form of screw jack having a collapsed height sufficiently low to engage beneath an axle under the conditions wherein a balloon tire is collapsed and have a sufficient range of lift to raise the axle high enough to be above its normal position when the tire is fully inflated and to provide a jack of this class having a pair of jack screws and a nut common to both and yieldably held from rotation, the arrangement of parts being of improved and novel character.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of a jack constructed in accordance with this invention.

Figure 2 is a vertical median section therethrough.

Figure 3 is a section on the line 3—3 of Figure 2.

Figure 4 is a section on the line 4—4 of Figure 2.

In the present embodiment of the invention there is provided a hollow base having a large lower portion 10 provided with a peripheral flange 11. Extending upwardly from this lower portion is an upper cylindrical or tubular portion 12 from the lower end of which depends a skirt 13 projecting into the large portion 10.

Slidably and rotatably mounted in the cylinder 12 is a hollow cylindrical nut 14 the lower end of which is provided with a large screw threaded opening 15 so that the nut may fit on a lower jack screw 16. The bottom part of the base is provided with a threaded closure 17 of sufficient size to permit assembling of the parts and the lower end of the lower jack screw is supported on this closure, as by the anti-friction ball 18.

The upper end of the nut 14 is provided with a relatively small screw threaded opening 19 wherein is fitted an upper jack screw 20 sufficiently smaller than the lower screw 14 that it may have its lower end received in a bore 21 extending longitudinally downward from the upper end of said lower jack screw 14.

In the inside wall of the portion 12 is a groove 22 wherein fits an oval spring band 23 of such shape and proportions as to press on both the nut and the groove wall, the band thus acting as a friction brake for the nut.

Keyed on the lower end of the screw 16 is a bevel gear 24 wherewith meshes a bevel pinion 25 journalled in a boss 26 projecting outwardly of the boss, the pinion being held in position by a retaining plate 27 secured by screws 28. Projecting through the retaining plate is a square head 29 provided with a ball snap 30 of usual construction so that a suitable turning tool, such as a long handled socket wrench, may be applied thereto for rotating the pinion. The upper screw is provided with a suitable gripping surface, such as a checkered end 3¹, at its top to engage an axle or the like and prevent rotation of the upper screw.

In use the device is collapsed and placed beneath an axle, being adjusted by hand to have the top 31 engage the axle or other part to be raised. Then, by rotating the pinion, the screw 16 acts to move the nut upwardly, the friction of the band 33 hindering its turning. Meanwhile the screw 20 is held from rotation by the grip of the surface 31. When the nut has moved upward to the point where the stop 32, formed on the upper end of the screw 16, engages the bottom end of said nut, then the nut and screw 16 will revolve together, the band friction being overcome. Consequently the screw 20 will be projected upwardly and this operation may be continued until the jack has attained its maximum height.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:—

1. A jack including a base member having a hollow body, a hollow jack screw rotatably mounted in said base, an elongated nut having its lower end engaged on the screw and slidably and rotatably mounted in said base, means to yieldably resist rotation of said nut, a second jack screw screwed into the upper end of the nut and telescoping in the first screw, and means to rotate the first screw.

2. A jack including a base member having a hollow body, a hollow jack screw rotatably mounted in said base, an elongated nut having its lower end engaged on the screw and slidably and rotatably mounted in said base, a friction brake engaging the nut to yieldably resist rotation of said nut, a second jack screw screwed into the upper end of the nut and telescoping the first screw, and means to rotate the first screw.

3. A jack including a base member having a hollow body, a hollow jack screw rotatably mounted in said base, an elongated nut having its lower end engaged on the screw and slidably and rotatably mounted in said base, an annular spring band surrounding the nut within the base and bearing on the nut and the interior of the base to yieldably resist rotation of said nut, a second jack screw screwed into the upper end of the nut and telescoping the first screw, and means to rotate the first screw.

4. A jack including a base member having a hollow body, a hollow jack screw rotatably mounted in said base, an elongated nut having its lower end engaged on the screw and slidably and rotatably mounted in said base, means to yieldably resist rotation of said nut, a second jack screw screwed into the upper end of the nut and telescoping in the first screw, a bevel gear fixed on the lower end of the first screw, and a driving pinion engaging said gear and having a shaft projecting outwardly of the base and provided with means for attaching a turning tool.

5. A jack including a base member having a hollow body, a hollow jack screw rotatably mounted in said base, an elongated nut having its lower end engaged on the screw and slidably and rotatably mounted in said base, a friction brake engaging the nut to yieldably resist rotation of said nut, a second jack screw screwed into the upper end of the nut and telescoping the first screw, a bevel gear fixed on the lower end of the first screw, and a driving pinion engaging said gear and having a shaft projecting outwardly of the base and provided with means for attaching a turning tool.

6. A jack including a base member having a hollow body, a hollow jack screw rotatably mounted in said base, an elongated nut having its lower end engaged on the screw and slidably and rotatably mounted in said base, an annular spring band surrounding the nut within the base and bearing on the nut and the interior of the base to yieldably resist rotation of said nut, a second jack screw screwed into the upper end of the nut and telescoping the first screw, a bevel gear fixed on the lower end of the first screw, and a driving pinion engaging said gear and having a shaft projecting outwardly of the base and provided with means for attaching a turning tool.

7. A jack including a base member having a hollow body, a hollow jack screw rotatably mounted in said base, an elongated nut having its lower end engaged on the screw and slidably and rotatably mounted in said base, means to yieldably resist rotation of said nut, a second jack screw screwed into the upper end of the nut and telescoping in the first screw, a gear fixed on the lower end of the first screw, and a driving pinion engaging said gear and having a shaft provided with means for attaching a turning tool.

8. A jack including a base member having a hollow body, a hollow jack screw rotatably mounted in said base, an elongated nut having its lower end engaged on the screw and slidably and rotatably mounted in said base, a friction brake engaging the nut to yieldably resist rotation of said nut, a second jack screw screwed into the upper end of the nut and telescoping the first screw, a gear fixed on the lower end of the first screw, and a driving pinion engaging said gear and having a shaft provided with means for attaching a turning tool.

In testimony whereof I affix my signature.

WILLIAM E. McKEE.